(12) United States Patent
Shimbo et al.

(10) Patent No.: US 11,479,240 B2
(45) Date of Patent: Oct. 25, 2022

(54) COLLISION AVOIDANCE ASSISTANCE APPARATUS

(71) Applicant: TOYOTA JIDOSHA KABUSHIKI KAISHA, Toyota (JP)

(72) Inventors: Yuto Shimbo, Toyota (JP); Tsunekazu Yasoshima, Toyota (JP); Masataka Sugimoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/021,028

(22) Filed: Sep. 15, 2020

(65) Prior Publication Data
US 2021/0237721 A1    Aug. 5, 2021

(30) Foreign Application Priority Data
Feb. 3, 2020    (JP) .............................. JP2020-016453

(51) Int. Cl.
| | | |
|---|---|---|
| *B60W 30/09* | (2012.01) | |
| *B60W 30/095* | (2012.01) | |
| *B60W 10/20* | (2006.01) | |
| *B60W 10/18* | (2012.01) | |
| *B60W 60/00* | (2020.01) | |

(52) U.S. Cl.
CPC ............ *B60W 30/09* (2013.01); *B60W 10/18* (2013.01); *B60W 10/20* (2013.01); *B60W 30/0956* (2013.01); *B60W 60/0015* (2020.02); *B60W 2420/42* (2013.01); *B60W 2420/52* (2013.01)

(58) Field of Classification Search
CPC ...... B60W 30/09; B60W 10/18; B60W 10/20; B60W 30/0956; B60W 60/0015; B60W 2420/42; B60W 2420/52; B60W 2050/143; B60W 2050/146; B60W 10/04; B60W 50/14; B60W 2552/50; B60T 7/22; G08G 1/166
See application file for complete search history.

(56) References Cited

U.S. PATENT DOCUMENTS 9,105,190 B2    8/2015    Akiyama
9,393,960 B2    7/2016    Kodaira
(Continued)

FOREIGN PATENT DOCUMENTS

JP    2017134519 A    8/2017

*Primary Examiner* — Sze-Hon Kong
*Assistant Examiner* — Ana D Thomas
(74) *Attorney, Agent, or Firm* — Dickinson Wright, PLLC

(57) ABSTRACT

A collision avoidance assist apparatus starts an autonomous steering control to autonomously steer and turn an own vehicle to orient the own vehicle in a laterally extending direction of an obstacle to avoid a collision of the own vehicle with the obstacle when the own vehicle potentially collides with the obstacle. The apparatus sets a first condition as a control termination condition used to determine whether to terminate the autonomous steering control, based on a laterally extending direction of the obstacle relative to the own vehicle when starting the autonomous steering control. The apparatus terminates the autonomous steering control when the obstacle is tracked, and a second condition different from the first condition becomes satisfied. The apparatus terminates the autonomous steering control when the obstacle is not tracked, and the first condition becomes satisfied.

9 Claims, 6 Drawing Sheets

(56) References Cited

U.S. PATENT DOCUMENTS

| | | |
|---|---|---|
| 9,405,727 B2 | 8/2016 | Nagata |
| 9,483,945 B2 | 11/2016 | Okita et al. |
| 9,669,760 B2 | 6/2017 | Hanita et al. |
| 9,873,412 B2 | 1/2018 | Moriizumi |
| 9,898,929 B2 | 2/2018 | Harada et al. |
| 9,965,955 B2 | 5/2018 | Fujishiro |
| 10,793,147 B2 | 10/2020 | Kaminade et al. |
| 10,946,830 B2 | 3/2021 | Sawai et al. |
| 11,175,673 B2 | 11/2021 | Eshima |
| 2004/0239490 A1* | 12/2004 | Chiba .................... G08G 1/166 340/435 |
| 2017/0210382 A1 | 7/2017 | Nishimura et al. |
| 2017/0369054 A1* | 12/2017 | Nishimura .......... B60W 30/095 |

\* cited by examiner

COLLISION AVOIDANCE ASSISTANCE APPARATUS

BACKGROUND

Field

The invention relates to a collision avoidance assist apparatus to assist a driver of an own vehicle to avoid the own vehicle from colliding with an obstacle.

Description of the Related Art

There is known a collision avoidance assist apparatus which executes an autonomous steering control to avoid an own vehicle from colliding with an obstacle when a front sensor such as a camera and a radar detects the obstacle which the own vehicle is likely to collides with. The collision avoidance assist apparatus is disclosed, for example, in JP 2017-134519 A. This disclosed collision avoidance assist apparatus executes the autonomous steering control to autonomously turn the own vehicle to move in an extending direction of a laterally extending obstacle to avoid the own vehicle from colliding with the laterally extending obstacle when (i) the laterally extending obstacle is detected, and (ii) the own vehicle is likely to collide with the laterally extending obstacle. The laterally extending obstacle is the obstacle laterally extending ahead of the own vehicle in a direction oblique to a longitudinally extending straight center line of the own vehicle.

The disclosed collision avoidance assist apparatus approximates the laterally extending obstacle such as a guard rail by a straight line. Then, the disclosed collision avoidance assist apparatus executes the autonomous steering control to autonomously turn the own vehicle to a direction parallel to the straight line representing the laterally extending obstacle to avoid the own vehicle from colliding with the laterally extending obstacle. Then, the disclosed collision avoidance assist apparatus calculates a control termination angle when the disclosed collision avoidance assist apparatus starts to execute the autonomous steering control. When the own vehicle has tuned by the control termination angle, the disclosed collision avoidance assist apparatus terminates executing the autonomous steering control.

However, if there are calculation errors and the like in the autonomous steering control, the autonomous steering control may not turn the vehicle enough to orient the vehicle in a laterally extending direction of the laterally extending obstacle. As shown in FIG. 6, the control termination angle q* may be set by adding a margin angle qm to an angle qt defined by the laterally extending direction of the laterally extending obstacle X and the longitudinally extending straight center line La of the own vehicle A. In particular, the angle qt is an angle defined by an approximated straight extending direction line Lt of the laterally extending obstacle X and the longitudinally extending straight center line La of the own vehicle A. Thus, if there are fewer calculation errors in the autonomous steering control, the vehicle is turned by an angle including the excess margin angle qm by the autonomous steering control. This may increase a possibility that the own vehicle encounters a secondary accident such as a collision of the own vehicle with another obstacle.

SUMMARY

The invention has been made for solving problems described above. An object of the invention is to provide a collision avoidance assist apparatus which can properly turn the own vehicle relative to the laterally extending obstacle.

A collision avoidance assist apparatus according to the invention is installed on an own vehicle. The collision avoidance assist apparatus comprises a sensor and an electronic control unit. The sensor acquires information on a situation ahead of the own vehicle. The electronic control unit is configured to detect an obstacle extending laterally and obliquely to a longitudinally extending center line of the own vehicle, based on the information acquired by the sensor.

The electronic control unit is configured to (i) start to execute an autonomous steering control to autonomously steer and turn the own vehicle to orient the own vehicle in a laterally extending direction of the obstacle to avoid the own vehicle from colliding with the obstacle when the electronic control unit detects the obstacle and determines that the own vehicle potentially collides with the obstacle, (ii) acquire the laterally extending direction of the obstacle relative to the own vehicle as an obstacle extending direction when the electronic control unit starts to execute the autonomous steering control, (iii) set a first condition as a control termination condition used to determine whether to terminate executing the autonomous steering control, based on the obstacle extending direction when the electronic control unit starts to execute the autonomous steering control, (iv) terminate executing the autonomous steering control when the electronic control unit tracks the obstacle, based on the information acquired by the sensor and determines that a second condition different from the first condition becomes satisfied while the electronic control unit executes the autonomous steering control, and (v) terminate executing the autonomous steering control when the electronic control unit does not track the obstacle, based on the information acquired by the sensor and determines that the first condition becomes satisfied while the electronic control unit executes the autonomous steering control.

The collision avoidance assist apparatus according to the invention is installed on the own vehicle. The collision avoidance assist apparatus according to the invention comprises the sensor and the electronic control unit. The sensor acquires the information on the situation ahead of the own vehicle. The electronic control unit is configured to detect the obstacle extending laterally and obliquely to the longitudinally extending center line of the own vehicle, based on the information acquired by the sensor. The electronic control unit starts to execute the autonomous steering control (in particular, the autonomous steering control to autonomously control steered wheels of the own vehicle) to autonomously steer and turn the own vehicle to orient the own vehicle in the laterally extending direction of the obstacle to avoid the own vehicle from colliding with the obstacle when the electronic control unit detects the obstacle and determines that the own vehicle potentially collides with the obstacle. Thereby, the own vehicle moves along the obstacle. Thus, the collision of the own vehicle with the obstacle can be prevented.

If the control termination condition is set to, for example, a condition that the own vehicle has turned by a control termination angle set by adding a margin angle set in consideration of calculation errors to an angle defined by the longitudinally extending center line of the own vehicle and the laterally extending direction of the obstacle, the own vehicle having the fewer calculation errors may excessively turn.

The electronic control unit determines whether the electronic control unit tracks the obstacle, i.e., the electronic control unit recognizes the obstacle while the electronic control unit executes the autonomous steering control.

When the electronic control unit tracks the obstacle, the electronic control unit can realize a current positional relationship between the obstacle and the own vehicle. Therefore, the electronic control unit can decide a proper timing of terminating executing the autonomous steering control, based on the positional relationship without turning the own vehicle by the control termination angle. Thus, the electronic control unit can avoid the own vehicle from colliding with the obstacle with preventing the own vehicle from excessively turning. On the other hand, when the electronic control unit does not track the obstacle, the electronic control unit cannot realize the current positional relationship between the obstacle and the own vehicle. Thus, the electronic control unit cannot decide the proper timing of terminating executing the autonomous steering control, based on the positional relationship.

The electronic control unit switches the control termination condition between when the sensor tracks the obstacle and when the sensor does not track the obstacle. Thus, according to the invention, the excess turning of the own vehicle relative to the obstacle can be prevented.

According to an aspect of the invention, the electronic control unit may be configured to acquire a control termination angle by which the electronic control unit needs to turn the own vehicle in order to orient the own vehicle in the laterally extending direction of the obstacle when the electronic control unit starts to execute the autonomous steering control. In this aspect, the first condition may be a condition that the obstacle is not in a predetermined area in front of the own vehicle, and the second condition may be a condition that the own vehicle has turned by the control termination angle.

With this aspect of the invention, the electronic control unit terminates executing the autonomous steering control when the electronic control unit determines that the obstacle is not in the predetermined area in front of the own vehicle while the electronic control unit tracks the obstacle. Thus, the excess turning of the own vehicle relative to the obstacle can be prevented. On the other hand, the electronic control unit terminates executing the autonomous steering control when the own vehicle has turned by the control termination angle while the electronic control unit does not track the obstacle. Thus, the collision of the own vehicle with the obstacle can be surely prevented even when the obstacle is not recognized during the autonomous steering control.

According to another aspect of the invention, the predetermined area may be a rectangular area having a lateral length equal to or longer than a width of the own vehicle and a longitudinal length equal to or longer than a distance between the own vehicle and a most distant point of the obstacle.

According to further another aspect of the invention, the control termination angle may be an angle acquired by adding a predetermined margin angle to an angle defined by the laterally extending direction of the obstacle and the longitudinally extending center line of the own vehicle.

According to further another aspect of the invention, the electronic control unit may be configured to determine that the electronic control unit does not track the obstacle when a lateral length of the obstacle is shorter than a predetermined value.

A target which the own vehicle is avoided from colliding with, is the obstacle extending obliquely to the longitudinally extending center line of the own vehicle. Therefore, when the lateral length of the obstacle is short, the electronic control unit may not properly determine whether the obstacle is in the predetermined area. However, the electronic control unit according to this aspect of the invention determines that the electronic control unit does not track the obstacle when the lateral length of the obstacle is shorter than the predetermined value. Thus, the autonomous steering control can be properly executed.

According to further another aspect of the invention, the electronic control unit may be configured to (i) acquire a position of a most distant point on the obstacle from the own vehicle with a predetermined cycle, based on the information acquired by the sensor, (ii) estimate a current position of the most distant point acquired last time, (iii) determine that the electronic control unit tracks the obstacle when the most distant point acquired this time is within a predetermine range from the estimated current position, and (iv) determine that the electronic control unit does not track the obstacle when the most distant point acquired this time is not within the predetermine range from the estimated current position.

According to further another aspect of the invention, the electronic control unit may be configured to (i) set a target avoidance route along which the electronic control unit moves the own vehicle to avoid the own vehicle from colliding with the obstacle when the electronic control unit starts to execute the autonomous steering control and (ii) turn and move the own vehicle such that the own vehicle moves along the target avoidance route while the electronic control unit executes the autonomous steering control.

According to further another aspect of the invention, the electronic control unit may be configured to (i) acquire a predicted collision amount of time predicted for the own vehicle to take to reach the obstacle if the own vehicle moves with maintaining a current moving state of the own vehicle, based on the information acquired by the sensor when the electronic control unit detects the obstacle and (ii) determine that the own vehicle potentially collides with the obstacle when the predicted collision amount of time becomes equal to or shorter than a predetermined threshold.

According to further another aspect of the invention, the electronic control unit may be configured to execute an autonomous brake control to autonomously brake the own vehicle when the electronic control unit executes the autonomous steering control.

According to further another aspect of the invention, the sensor may include at least one of a camera sensor and a radar sensor.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Below, a collision avoidance assist apparatus applied to a vehicle according to an embodiment of the invention will be described with reference to the drawings.

Figure 1:
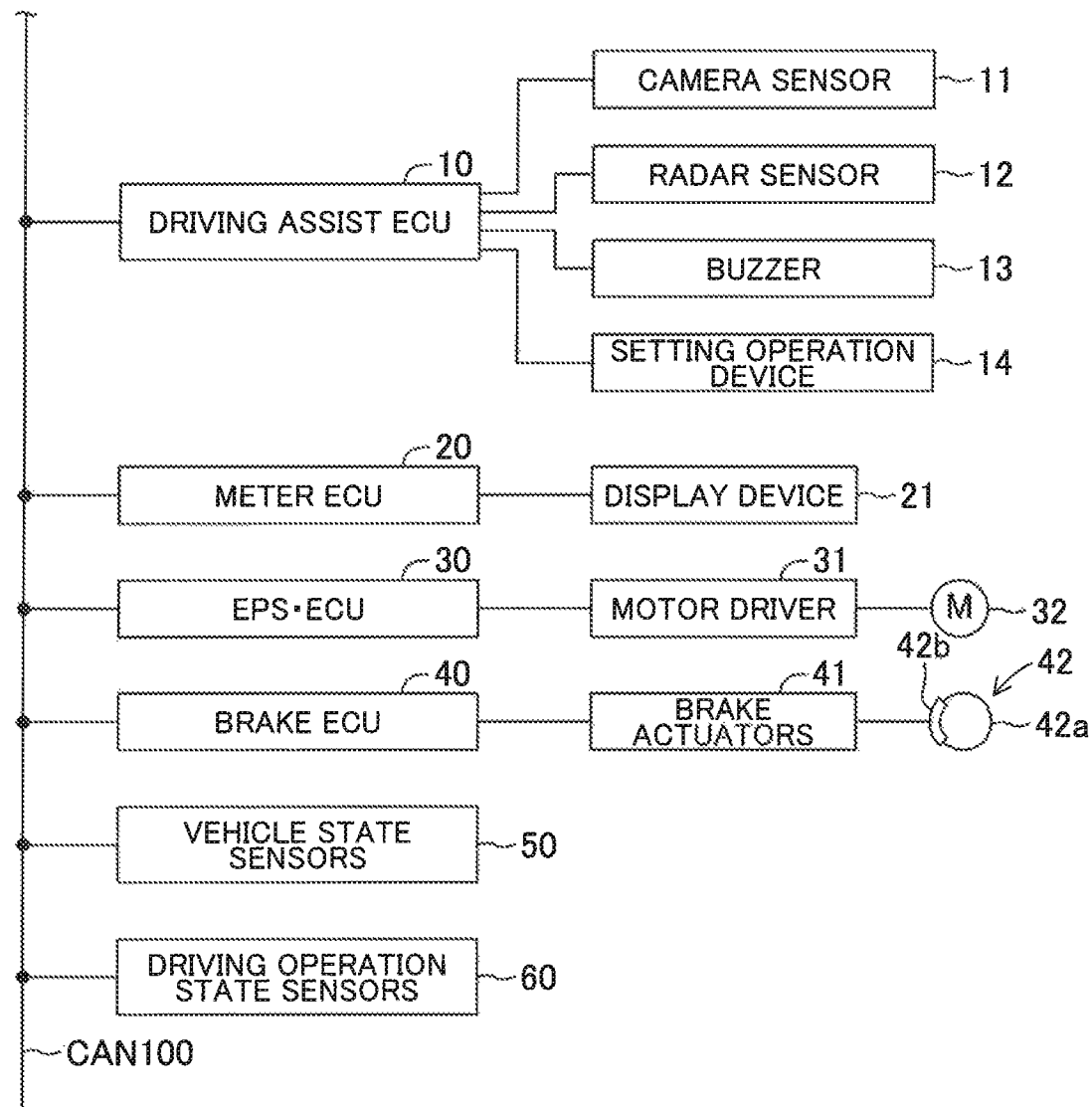
FIG. 1 is a view showing a collision avoidance assist apparatus according to an embodiment of the invention.

The collision avoidance assist apparatus according to the embodiment of the invention is installed on the vehicle. Hereinafter, the vehicle to which the collision avoidance assist apparatus according to the embodiment of the invention is installed, will be referred to as "the own vehicle" in order to distinguish the vehicle to which the collision driving assist apparatus according to the embodiment of the invention is installed, from other vehicles. As shown in FIG. 1, the collision avoidance assist apparatus according to the embodiment of the invention includes a driving assist ECU 10, a meter ECU 20, an electric power steering ECU 30, and a brake ECU 40.

Each of the ECUs 10, 20, 30, and 40 is an electronic control unit including a micro-computer as a main component. The ECUs 10, 20, 30, and 40 are connected so as to send and receive information to and from each other via a CAN 100 (i.e., Controller Area Network). In this embodiment, the micro-computer includes a CPU, a ROM, a RAM, a non-volatile memory, and an interface I/F. The CPU is configured or programmed to realize various functions by executing instructions, programs, and routines memorized in the ROM. Some or all of the ECUs 10, 20, 30, and 40 may be one ECU.

Vehicle state sensors 50 and driving operation state sensors 60 are electrically connected to the CAN 100. The vehicle state sensors 50 detect vehicle states. The driving operation state sensors 60 detect driving operation states. The vehicle state sensors 50 include, for example, a vehicle moving speed sensor, a wheel speed sensor, a longitudinal acceleration sensor, a lateral acceleration sensor, and a yaw rate sensor. The vehicle moving speed sensor detects a moving speed of the own vehicle. The wheel speed sensor detects rotation speeds of road wheels of the own vehicle. The longitudinal acceleration sensor detects a longitudinal acceleration of the own vehicle. The lateral acceleration sensor detects a lateral acceleration of the own vehicle. The yaw rate sensor detects a yaw rate of the own vehicle.

The driving operation state sensors 60 includes sensors includes an acceleration pedal operation amount sensor, a brake pedal operation amount sensor, a brake switch, a steering angle sensor, a steering torque sensor, and a shift position sensor. The acceleration pedal operation amount sensor detects an amount of an operation applied to an acceleration pedal. The brake pedal operation amount sensor detects an amount of an operation applied to a brake pedal. The brake switch detects an operation applied to the brake pedal. The steering angle sensor detects a steering angle. The steering torque sensor detects a steering torque. The shift position sensor detects a shift position of a transmission.

Information detected by the vehicle state sensors 50 and the driving operation state sensors 60 is sent to the CAN 100. Hereinafter, the information detected by the vehicle state sensors 50 and the driving operation state sensors 60 will be referred to as "the sensor information." The ECUs 10, 20, 30, and 40 can use the sensor information sent to the CAN 100. One or more of the sensors 50 and 60 may be electrically connected directly to certain one of the ECUs 10, 20, 30, and 40. In this case, the sensor information of the one or more sensors electrically connected to the certain ECU, is sent to the CAN 100 via the certain ECU. For example, the steering angle sensor may be electrically connected directly to the electric power steering ECU 30. When the steering angle sensor is electrically connected directly to the electric power steering ECU 30, the sensor information on the steering angle is sent from the electric power steering ECU 30 to the CAN 100. This can be applied to the other sensors. Alternatively, the certain ECUs may directly send and receive the sensor information to and from each other without the CAN 100.

The driving assist ECU 10 is a main control unit which provides a driver driving assist to a driver of the own vehicle. The driving assist ECU 10 executes a collision avoidance assist control. The collision avoidance assist control is one of driving assist controls. The collision avoidance assist control is a control to (i) alert the driver when an obstacle is detected ahead of the own vehicle and (ii) avoid the own vehicle from colliding with the obstacle by at least one of autonomously braking the own vehicle and autonomously steering the own vehicle when a level of a potential that the own vehicle collides with the obstacle, reaches a high level. The collision avoidance assist control is generally referred to as "the PCS control" or "the pre-crash safety control." Hereinafter, the collision avoidance assist control will be referred to as "the PCS control".

The driving assist ECU 10 may be configured to execute the other driving assist controls in addition to the PCS control. For example, the driving assist ECU 10 may be configured to execute a lane keeping assist control to move the own vehicle along a center line of a traffic lane.

The driving assist ECU 10 is electrically connected to a camera sensor 11, a radar sensor 12, a buzzer 13, and a setting operation device 14.

The camera sensor 11 is provided at an upper portion of a front windshield in an interior of the own vehicle. The camera sensor 11 includes a camera section and an image processing section which analyzes image data on images taken by the camera section. The camera sensor 11 (in particular, the camera section) is, for example, a stereo camera and takes images of a view ahead of the own vehicle. The camera sensor 11 (in particular, the image processing section) recognizes white lane markings provided on a road and standing objects ahead of the own vehicle and provides information on the white lane markings and the standing objects to the driving assist ECU 10 with a predetermined cycle. Hereinafter, the information on the white lane markings will be referred to as "the white lane markings information", and the information on the standing objects will be referred to as "the standing object information." The white lane marking information is information on (i) positional relationships between the own vehicle and the white lane markings including a directional relationship between the own vehicle and the white lane markings and (ii) curvatures of the white lane markings. The standing object information is information on (i) kinds of the standing objects detected ahead of the own vehicle, (ii) sizes of the detected standing objects, and (iii) positional relationships between the detected standing objects and the own vehicle.

The radar sensor 12 is provided on a front center portion of a body of the own vehicle. The radar sensor 12 detects the standing objects ahead of the own vehicle. The radar sensor 12 includes a radar radiating-receiving section (not shown) and a signal processing section (not shown). The radar radiating-receiving section radiates radio waves of millimeter waveband. Hereinafter, the radio waves of the millimeter waveband will be referred to as "the millimeter waves." The radar radiating-receiving section receives the millimeter waves reflected by the standing objects such as other vehicles, walking persons, bicycles, and buildings within a radiation area. Hereinafter, the millimeter waves reflected by the standing objects will be referred to as "the reflected millimeter waves." The signal processing section performs calculations to calculate (i) distances between the own vehicle and the standing objects, (ii) relative speeds between the own vehicle and the standing objects, and (iii) relative positions and orientations of the standing objects relative to the own vehicle, based on (i) differences in phase between the radiated millimeter waves and the received reflected millimeter waves, (ii) attenuation levels of the received reflected millimeter waves, and (iii) amounts of time from radiating the millimeter waves to receiving the reflected millimeter waves. The signal processing section provides information on results of the calculations as the standing object information to the driving assist ECU 10 with the predetermined cycle. The standing object information includes polar coordinate point information on polar coordinate points on a polar coordinate system, representing points where the millimeter waves which the radar sensor 12 receives, are reflected.

The driving assist ECU 10 synthesizes the standing object information provided from the camera sensor 11 and the standing object information provided from the radar sensor 12 to acquire the high-accuracy standing object information. For example, when the camera sensor 11 detects the standing object at the same position as the position defined by the polar coordinate points represented by the polar coordinate point information provided from the radar sensor 12, the polar coordinate point information is deemed to be highly reliable information and is used in the collision avoidance control.

Hereinafter, information on situations ahead of the own vehicle acquired from the camera sensor 11 and the radar sensor 12 will be referred to as "the front information." In addition, the camera sensor 11 and the radar sensor 12 will be collectively referred to as "the front sensors."

The buzzer 13 generates sounds in response to a buzzer activation signal output from the driving assist ECU 10. The driving assist ECU 10 activates the buzzer 13 to inform driving assist states to the driver and alert the driver.

The setting operation device 14 is a device which the driver operate to perform various setting. The setting operation device 14 is provided, for example, on a steering wheel. The driving assist ECU 10 executes various setting processes in response to setting signals sent from the setting operation device 14. For example, the setting operation device 14 is used to activate or disactivate the driving assist controls including the PCS control.

The meter ECU 20 is electrically connected to a display device 21. The display device 21 may be a multi-information display provided in front of a driver's seat. The display device 21 displays (i) meters indicating the vehicle moving speed and the like and (ii) various information. For example, when the meter ECU 20 receives a display command from the driving assist ECU 10, depending on the driving assist states, the meter ECU 20 displays an image specified by the display command on the display device 21. A head-up display (not shown) may be provided as the display device 21 in place of or in addition to the multi-information display.

When the head-up display is provided, an ECU dedicated to controlling displaying the images on the head-up display, may be provided.

The electric power steering ECU 30 is a control unit which controls an electric power steering apparatus of the own vehicle. Hereinafter, the electric power steering ECU 30 will be referred to as "the EPS ECU 30." The EPS ECU 30 is electrically connected to a motor driver 31. The motor driver 31 is electrically connected to a turning motor 32. The turning motor 32 is a turning actuator. The turning motor 32 is installed in a steering mechanism (not shown) of the own vehicle. The EPS ECU 30 detects the steering torque which the driver inputs by the steering wheel (not shown) through the steering torque sensor provided on a steering shaft (not shown). The EPS ECU 30 controls energization of the motor driver 31 to activate the turning motor 32, based on the detected steering torque. An assist steering torque is applied to the steering mechanism by activating the turning motor 32 to assist steering operations of the driver.

When the EPS ECU 30 receives a steering command from the driving assist ECU 10 via the CAN 100, the EPS ECU 30 activates the turning motor 32 by a control amount specified by the steering command to generate the steering torque. The generated steering torque is different from the assist steering torque applied to the steering mechanism for reducing the steering torque which the driver needs to apply to the steering wheel. The generated steering torque is a torque applied to the steering mechanism by the steering command sent from the driving assist ECU 10 without a driver's steering operation.

The brake ECU 40 is electrically connected to brake actuators 41. The brake actuators 41 are provided in a hydraulic circuit between a master cylinder (not shown) and a respective friction brake mechanism 42. The master cylinder compresses hydraulic oil, depending on a pressing force applied to the brake pedal by the driver. The friction brake mechanisms 42 are provided, corresponding to a left front wheel, a right front wheel, a left rear wheel, and a right rear wheel of the own vehicle, respectively. Each of the friction brake mechanisms 42 includes a brake disc 42a and a brake caliper 42b. The brake disc 42a is secured to a respective road wheel of the own vehicle. The brake caliper 42b is secured to the body of the own vehicle. Each of the brake actuators 41 adjusts hydraulic pressure applied to a respective wheel cylinder (not shown), depending on a command sent from the brake ECU 40. The wheel cylinders are installed in the respective brake calipers 42b. Each of the wheel cylinders are activated by the adjusted hydraulic pressure. Each of brake pads (not shown) are pressed to the respective brake discs 42a to generate a braking force by an activation of the respective wheel cylinder. Thereby, the brake ECU 40 can control the braking forces applied to the own vehicle by controlling the brake actuators 41.

<PCS Control>

Next, the PCS control will be described. The driving assist ECU 10 determines whether the own vehicle collides with the standing object, based on (i) the front information provided from the front sensors and (ii) vehicle states detected by the vehicle state sensors 50. For example, the driving assist ECU 10 performs a determination to determine whether the own vehicle collides with the standing object if (i) the standing object moves with maintaining a current moving state thereof (or the standing object is in a stopped state when the standing object is a stationary object), and (ii) the own vehicle moves with maintaining a current moving state thereof. When the driving assist ECU 10 determines that the own vehicle collides with the standing object, the driving assist ECU 10 identifies the standing object as the obstacle, based on a result of the determination.

When the driving assist ECU 10 detects the obstacle, the driving assist ECU 10 calculates a predicted collision amount of time TTC. The predicted collision amount of time TTC is a predicted amount of time predicted for the own vehicle to take to collide with the obstacle. The predicted collision amount of time TTC is calculated, based on (i) the distance d between the obstacle and the own vehicle, and (ii) the relative speed Vr of the own vehicle relative to the obstacle as shown by a following equation (1).

$$TTC=d/Vr \quad (1)$$

The predicted collision amount of time TTC is used as an index representing the level of the potential that the own vehicle collides with the obstacle. The level of the potential or risk that the own vehicle collides with the obstacle, increases as the predicted collision amount of time TTC decreases.

According to the PCS control of this embodiment, there are provided two levels, i.e., a first level and a second level of the potential that the own vehicle collides with the obstacle, based on the predicted collision amount of time TTC. At the first level, the driving assist ECU 10 warns the driver, using the buzzer 13 and the display device 21. When the level of the potential that the own vehicle collides with the obstacle reaches the second level higher than the first level, the driving assist ECU 10 provides a collision avoidance assist to the driver by at least one of an autonomous brake control and an autonomous steering control.

The driving assist ECU 10 determines that the level of the potential that the own vehicle collides with the obstacle, reaches the first level when the predicted collision amount of time TTC becomes equal to or shorter than a warning threshold TTCw. When the predicted collision amount of time TTC decreases further and becomes equal to or shorter than an activation threshold TTCa (<TTCw), the driving assist ECU 10 determines that the level of the potential that the own vehicle collides with the obstacle, reaches the second level.

Next, the autonomous steering control executed by the driving assist ECU 10 will be described. When the driving assist ECU 10 detects a laterally extending structural object and determines that the own vehicle is likely to collide with the detected laterally extending structural object, the driving assist ECU 10 executes the autonomous steering control to autonomously steer and turn the own vehicle to cause the own vehicle to move along the detected laterally extending structural object. The lateral extending structural object is an object laterally extending ahead of the own vehicle in a direction oblique to a longitudinally extending straight center line of the own vehicle. Hereinafter, this autonomous steering control will be referred to as "the laterally extending obstacle steering avoidance control." The laterally extending structural object is, for example, a guard rail or a wall having a surface which is opposite to the own vehicle and can be approximated by a straight line.

<Laterally Extending Obstacle Steering Avoidance Control Routine>

Figure 2:
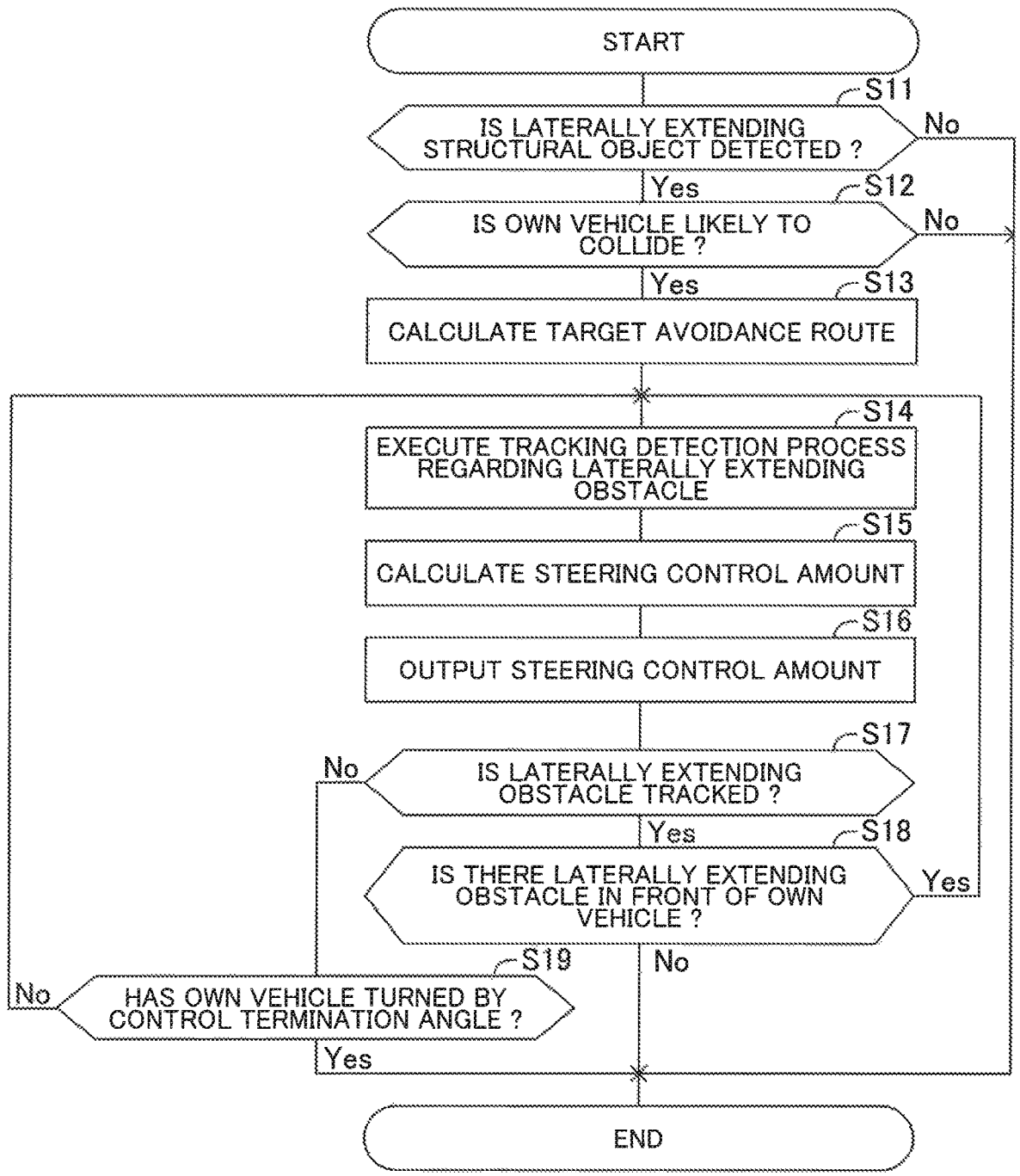
FIG. 2 is a view showing a flowchart of a laterally extending obstacle steering avoidance control routine.

FIG. 2 shows a laterally extending obstacle steering avoidance control routine including a concrete laterally extending obstacle steering avoidance control process executed by the driving assist ECU 10. The driving assist ECU 10 executes the laterally extending obstacle steering avoidance control routine with a predetermined calculation cycle.

When the driving assist ECU 10 starts to execute the laterally extending obstacle steering avoidance control routine, the driving assist ECU 10 determines whether the laterally extending obstacle is detected ahead of the own vehicle, based on the front information provided from the front sensors at a step S11.

Figure 3:
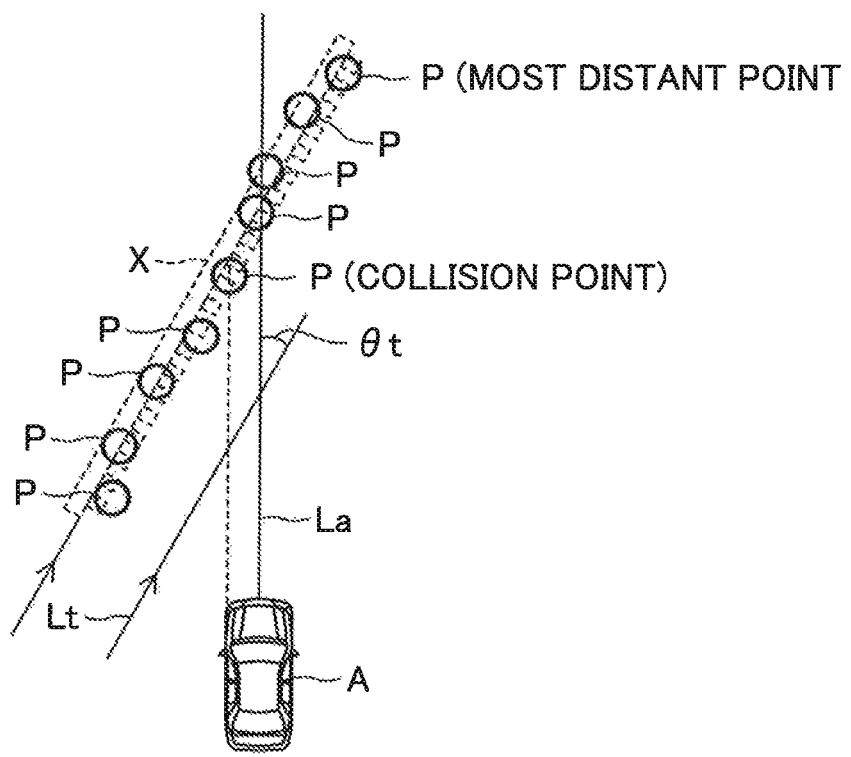
FIG. 3 is a plan view showing polar coordinate points.

The front information provided from the front sensors includes information on the polar coordinate points of the detected standing objects. Therefore, as shown in FIG. 3, a combination of the detected adjacent polar coordinate points P can be recognized as one structural object. When the structural object defined by the combination of the detected adjacent polar coordinate points P, extends laterally and obliquely to the longitudinally extending straight center line La of the own vehicle A, the structural object is recognized as the laterally extending structural object X.

In addition, the laterally extending structural object X is approximated by the straight line. In this embodiment, an angle defined by (i) a line Lt representing a laterally extending direction of the laterally extending structural object X and (ii) the longitudinally extending straight center line La of the own vehicle A, is an angle qt. Hereinafter, the angle qt will be referred to as "the angle difference qt."

When the driving assist ECU 10 determines that the laterally extending structural object X is not detected ahead of the own vehicle A (S11: No), the driving assist ECU 10 terminates executing this routine once. When the driving assist ECU 10 determines that the laterally extending structural object X is detected ahead of the own vehicle A, the driving assist ECU 10 proceeds with the process to a step S12 to determine whether the own vehicle A is likely to collide with the laterally extending structural object X. For this process, the driving assist ECU 10 estimates and acquires a collision point where the own vehicle A collides with the laterally extending structural object X if the own vehicle A moves with maintaining the current moving state thereof. In addition, the driving assist ECU 10 calculates and acquires the predicted collision amount of time TTC predicted for the own vehicle to take to reach the acquired collision point. The driving assist ECU 10 determines whether the level of the potential that the own vehicle A collides with the laterally extending structural object X, is high, based on whether the predicted collision amount of time TTC is shorter than or equal to the activation threshold TTCa.

When the driving assist ECU 10 determines that the predicted collision amount of time TTC is longer than the activation threshold TTCa, the driving assist ECU 10 terminates executing this routine once. On the other hand, when the driving assist ECU 10 determines that the predicted collision amount of time TTC is shorter than or equal to the activation threshold TTCa, the driving assist ECU 10 proceeds with the process to a step S13. Hereinafter, the laterally extending structural object X determined to have the predicted collision amount of time TTC shorter than or equal to the activation threshold TTCa, will be referred to as "the laterally extending obstacle X."

Figure 6:
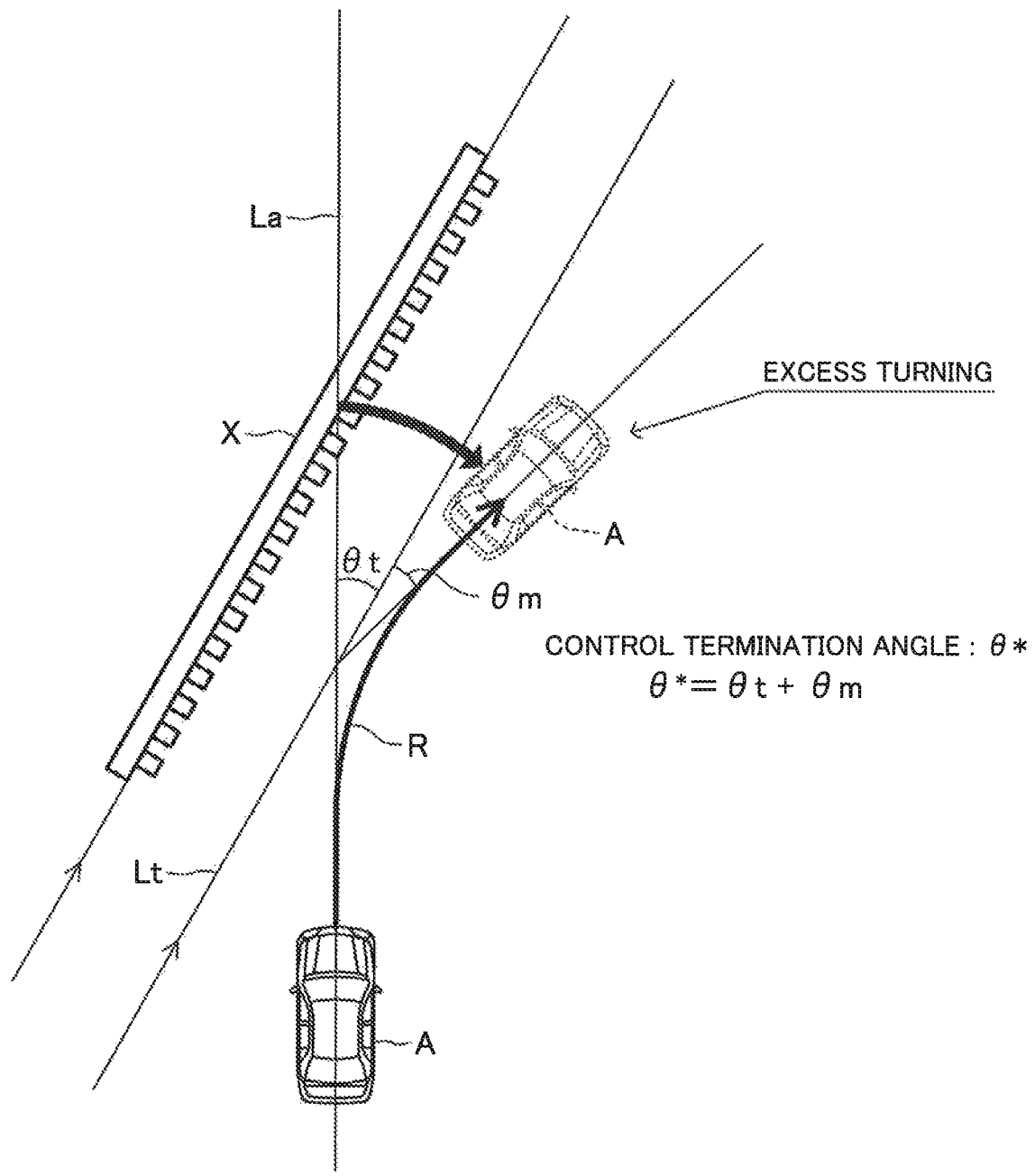
FIG. 6 is a plan view showing a target avoidance route of an own vehicle relative to the laterally extending obstacle.

At the step S13, the driving assist ECU 10 calculates and acquires a target avoidance route used to turn and move the own vehicle A to orient the own vehicle in the laterally extending direction of the laterally extending obstacle X. For this process, as shown in FIG. 6, the driving assist ECU 10 calculates and acquires the angle difference qt corresponding to the angle defined by (i) the laterally extending direction line Lt of the laterally extending obstacle X and (ii) the longitudinally extending straight center line La or a longitudinally extending axis of the own vehicle A. The driving assist ECU 10 sets a control termination angle q* to an angle acquired by adding the margin angle qm to the angle difference qt (q*=qt+qm)

The driving assist ECU 10 calculates and acquires a route which causes the own vehicle A to turn by the control termination angle q* to avoid the own vehicle A from colliding with the laterally extending obstacle X, as the target avoidance route. Therefore, the target avoidance route is a route of the own vehicle A from the present position to a position where a turning angle of the own vehicle A reaches the control termination angle q*. The turning angle of the own vehicle A corresponds to an angle of turning the own vehicle A after the present point of time when the autonomous steering control starts to be executed. The target avoidance route is, for example, a route R shown in FIG. 6.

Next, the driving assist ECU 10 proceeds with the process to a step S14 to execute a tracking detection process regarding the laterally extending obstacle X. For this process, as shown in (a) of FIG. 4, the driving assist ECU 10 reads the polar coordinate points P near the detected laterally extending obstacle X. In addition, the driving assist ECU 10 selects the most distant polar coordinate point P as the polar coordinate point Pold from the polar coordinate points P which the driving assist ECU 10 read last time and estimates a current position of the polar coordinate point Pold, based on (i) a last position of the polar coordinate point Pold and (ii) the moving states of the own vehicle A. Hereinafter, the most distant polar coordinate point among the polar coordinate points which the driving assist ECU 10 reads, will be referred to as "the most distant point", and the current position of the most distant point which the driving assist ECU 10 estimates, will be referred to as "the estimated most distant point position Plyosoku."

In addition, the driving assist ECU 10 determines whether the position of the most distant point P1now which the driving assist ECU 10 detects this time, corresponds to the estimated most distant point position Plyosoku. In other words, the driving assist ECU 10 determines whether the position of the most distant point P1now which the driving assist ECU 10 detects this time, is close to the estimated most distant point position Plyosoku. In other words, the driving assist ECU 10 determines whether a distance between (i) the position of the most distant point P1now which the driving assist ECU 10 detects this time and (ii) the estimated most distant point position Plyosoku, is shorter than or equal to a certain distance. When the driving assist ECU 10 does not detect the most distant point P1now corresponding to the estimated most distant point position Plyosoku, the driving assist ECU 10 determines not to track the laterally extending obstacle X. For the processes described above, the driving assist ECU 10 stores the polar coordinate information on the most distant point P1now at least until the driving assist ECU 10 executes the tracking detection process regarding the laterally extending obstacle X next time. In other words, the driving assist ECU 10 stores the polar coordinate information on the most distant point P1now at least for one calculation cycle.

Figure 4:
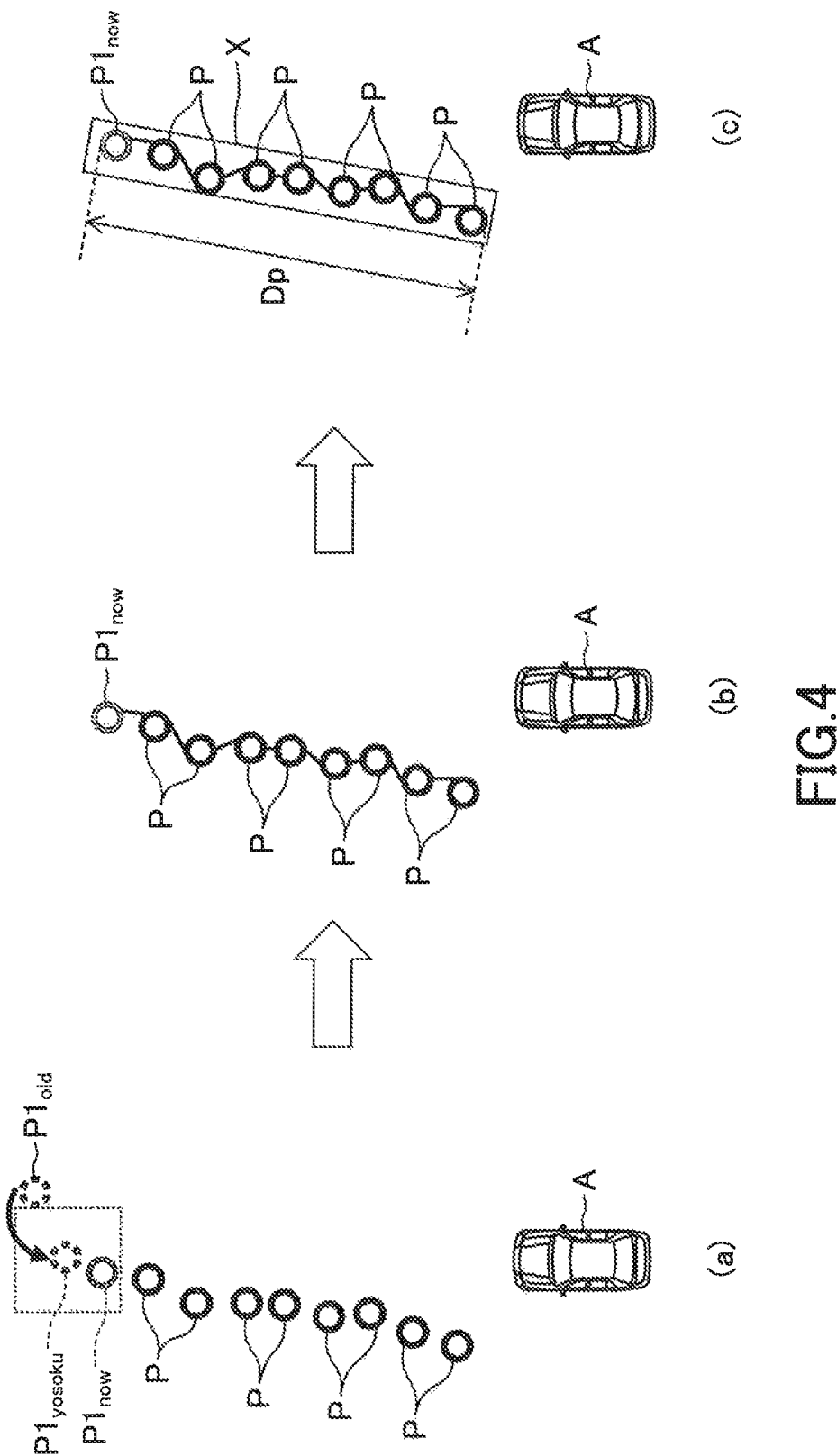
FIG. 4 is a plan view showing a tracking detection of the laterally extending obstacle.

On the other hand, when the driving assist ECU 10 determines that the estimated most distant point position Plyosoku corresponds to the most distant point P1now which the driving assist ECU 10 detects this time, the driving assist ECU 10 connects the most distant point P1now which the driving assist ECU 10 detects this time, to the polar coordinate point P next to the most distant point P1now at the side of the own vehicle as shown in (b) of FIG. 4. In addition, the driving assist ECU 10 determines whether a length Dp from the most distant point P to the polar coordinate point P nearest the own vehicle A, is longer than or equal to a predetermined length Dpref (for example, 10 meters). Hereinafter, the length Dp will be referred to as "the total length Dp." When the driving assist ECU 10 determines that the total length Dp is longer than or equal to the predetermined length Dpref, the driving assist ECU 10 determines that the laterally extending obstacle X is recognized or tracked. On the other hand, when the driving assist ECU 10 determines that the total length Dp is shorter than the predetermined length Dpref, the driving assist ECU 10 determines that the laterally extending obstacle X is not recognized or tracked.

Next, the driving assist ECU 10 proceeds with the process to a step S15 to calculate and acquire a steering control amount (for example, a target steering angle) to move the own vehicle A along the target avoidance route, based on the target avoidance route.

Next, the driving assist ECU 10 proceeds with the process to a step S16 to send a steering command representing the calculated steering control amount to the EPS ECU 30. In response to the steering command, the EPS ECU 30 controls activations of the motor driver 31 to achieve the steering control amount. Thus, the autonomous steering control starts.

Next, the driving assist ECU 10 proceeds with the process to a step S17 to determine whether the laterally extending obstacle X is tracked. For this process, the driving assist ECU 10 utilizes a result of the tracking detection process regarding the laterally extending obstacle X at the step S14.

Figure 5A:
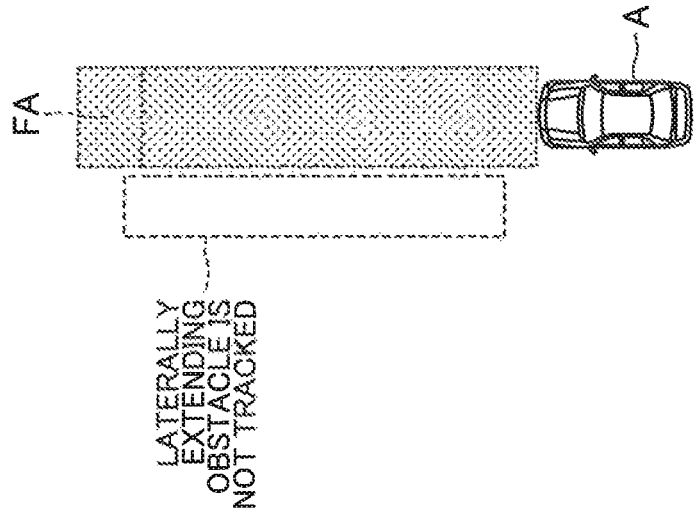
FIG. 5A is a plan view showing a relationship between the laterally extending obstacle and a predetermined area.

When the driving assist ECU 10 determines that the laterally extending obstacle X is tracked (S17: Yes), the driving assist ECU 10 proceeds with the process to a step S18 to determine whether there is the laterally extending obstacle X in a predetermined area FA in front of the own vehicle A as shown in FIG. 5A. In particular, the driving assist ECU 10 determines whether there is at least a part of the laterally extending obstacle X in the predetermined area FA. As shown in gray in FIG. 5A, the predetermined area FA is a rectangular area (i) having a lateral length and a longitudinal length and (ii) extending forwards from the own vehicle A. The lateral length of the predetermined area FA corresponds to a width of the own vehicle A. The longitudinal length of the predetermined area FA corresponds to a forward distance Dfa acquired by adding a margin distance Dm to a length D1 longitudinally from the own vehicle A to the most distant point P1now (Dfa=D1+Dm). In other words, the predetermined area FA corresponds to an area in a planar surface which the body of the own vehicle A will occupy when the own vehicle A moves straight by the forward distance Dfa. It should be noted that the predetermined area FA is not limited to one described above. The predetermined area FA may be optionally set, for example, to an area having the lateral length corresponding to a length acquired by adding a predetermined margin distance to the width of the own vehicle A.

Just after the autonomous steering control starts, there must be the laterally extending obstacle X in the predetermined area FA in front of the own vehicle A as shown in FIG. 5A. When there is the laterally extending obstacle X in the predetermined area FA, the driving assist ECU 10 determines "Yes" at the step S18 and returns the process to the step S14. In this case, the driving assist ECU 10 executes processes described above again. While the processes described above are executed, an orientation of the own vehicle A is changed to an orientation or the laterally extending direction of the laterally extending obstacle X by the autonomous steering control.

Figure 5B:
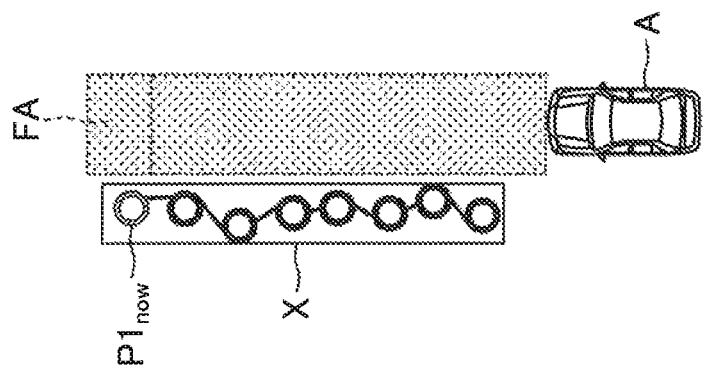
FIG. 5B is a plan view showing another relationship between the laterally extending obstacle and the predetermined area.

When the driving assist ECU 10 determines that there is not the laterally extending obstacle X in the predetermined area FA in front of the own vehicle A as shown in FIG. 5B while the laterally extending obstacle X is tracked, the driving assist ECU 10 terminates executing this routine once. In particular, when the driving assist ECU 10 determines that even a part of the laterally extending obstacle X is not in the predetermined area FA while the laterally extending obstacle X is tracked, the driving assist ECU 10 terminates executing this routine once. In other words, when the driving assist ECU 10 determines that the laterally extending obstacle X which the driving assist ECU 10 has recognized, becomes out of the predetermined area FA while the laterally extending obstacle X is tracked, the driving assist ECU 10 terminates executing this routine once. Thereby, the autonomous steering control is terminated. In this case, even when the turning angle of the own vehicle A does not reach the control termination angle q*, the autonomous steering control can be terminated when the recognized laterally extending obstacle X becomes out of the predetermined area FA in front of the own vehicle A. Thus, an excess turning of the own vehicle A can be prevented.

Figure 5C:
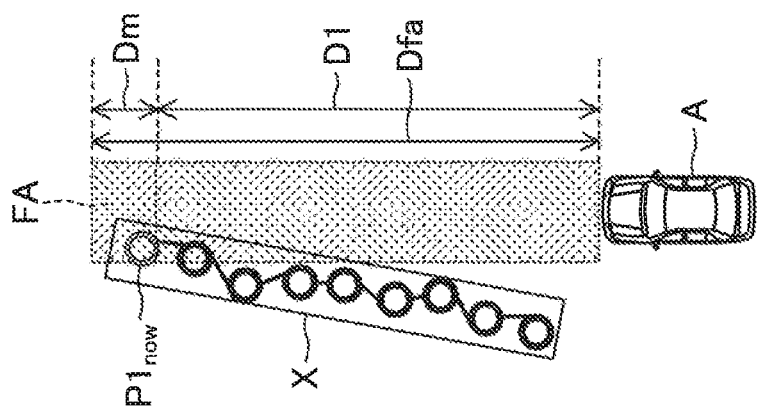
FIG. 5C is a plan view showing further another relationship between the laterally extending obstacle and the predetermined area.

On the other hand, when the driving assist ECU 10 does not track the laterally extending obstacle X during the autonomous steering control as shown in FIG. 5C (S17: No), the driving assist ECU 10 proceeds with the process to a step S19. At the step S19, the driving assist ECU 10 determines whether the own vehicle A has turned by the control termination angle q*. The turning angle of the own vehicle A is acquired, for example, by integrating the yaw rates detected by the yaw rate sensor. At the step S19, the driving assist ECU 10 determines whether the turning angle of the own vehicle A from when the driving assist ECU 10 starts to execute the autonomous steering control, reaches the control termination angle q*. When the driving assist ECU 10 determines that the own vehicle A has not turned by the control termination angle q* (S19: No), the driving assist ECU 10 returns the process to the step S14. In this case, the autonomous steering control continues.

When the driving assist ECU 10 does not track the laterally extending obstacle X and determines that the own vehicle A has turned by the control termination angle q* (S19: Yes) while the driving assist ECU 10 executes the processes described above, the driving assist ECU 10 terminates executing this routine once. Therefore, the autonomous steering control is terminated when the turning angle of the own vehicle A reaches the control termination angle q*. Thus, even when the laterally extending obstacle X is not tracked during the autonomous steering control, a collision of the own vehicle A with the laterally extending obstacle X can be avoided.

As described above, according to the driving assist ECU 10 according to the embodiment, the target avoidance route is set to turn the own vehicle A by the control termination angle q* set, depending on the laterally extending direction of the laterally extending obstacle X to orient the own vehicle A in the laterally extending direction of the laterally extending obstacle X when the laterally extending obstacle X is detected. Then, the autonomous steering control is executed to move the own vehicle A along the target avoidance route.

When the laterally extending obstacle X is tracked and recognized, the relationship in position between the laterally extending obstacle X and the own vehicle A can be recognized. Therefore, a timing of terminating executing the autonomous steering control can be set, based on the relationship in position between the laterally extending obstacle X and the own vehicle A even when the own vehicle A has not turned by the control termination angle q*. According to this embodiment, when the laterally extending obstacle X is tracked, the autonomous steering control is terminated at a point of time when the driving assist ECU 10 confirms that there is not the laterally extending obstacle X in the predetermined area FA in front of the own vehicle A. Therefore, the excess turning of the own vehicle A relative to the laterally extending obstacle X can be prevented. Thus, a secondary accident can be prevented.

On the other hand, when the laterally extending obstacle X is not tracked, the autonomous steering control is continued until the own vehicle A has turned by the control termination angle q*. Thus, the collision of the own vehicle A with the laterally extending obstacle X can be surely avoided.

Moreover, when the total length Dp acquired by connecting the polar coordinate points P of the laterally extending obstacle X is shorter than the predetermined length Dpref, the laterally extending obstacle X is determined not to be tracked. Thus, the laterally extending obstacle steering avoidance control can be properly executed.

The collision avoidance assist apparatus according to the embodiment has been described. The invention is not limited to the embodiment. Various modifications can be applied to the embodiment without departing from the scope of the invention.

For example, the laterally extending obstacle steering avoidance control may be executed together with the autonomous brake control. Alternatively, the laterally extending obstacle steering avoidance control may be executed without the autonomous brake control. Further, the laterally extending obstacle steering avoidance control may be executed when the collision of the own vehicle with the laterally extending obstacle cannot be avoided only by the autonomous brake control.

Further, according to the embodiment, the autonomous steering control is executed, based on the front information on the own vehicle. For example, there may be provided rear sensors such as a radar sensor and a camera sensor which detect a situation behind and surrounding the own vehicle (for example, left-rearwards and right-rearwards of the own vehicle), and rear information on the own vehicle may be acquired. In this case, the collision avoidance assist by the autonomous steering control can be provided to the driver with monitoring other vehicles moving behind the own vehicle.

What is claimed is:

1. A collision avoidance assist apparatus installed on an own vehicle, comprising:
    a sensor which acquires information on a situation ahead of the own vehicle; and
    an electronic control unit configured to detect an obstacle extending laterally and obliquely to a longitudinally extending center line of the own vehicle, based on the information acquired by the sensor,
    wherein the electronic control unit is configured to:
        start to execute an autonomous steering control to autonomously steer and turn the own vehicle to orient the own vehicle in a laterally extending direction of the obstacle to avoid the own vehicle from colliding with the obstacle when the electronic control unit detects the obstacle and determines that the own vehicle potentially collides with the obstacle;
        acquire the laterally extending direction of the obstacle relative to the own vehicle as an obstacle extending direction when the electronic control unit starts to execute the autonomous steering control;

set a first condition as a control termination condition used to determine whether to terminate executing the autonomous steering control, based on the obstacle extending direction when the electronic control unit starts to execute the autonomous steering control;

terminate executing the autonomous steering control when the electronic control unit tracks the obstacle, based on the information acquired by the sensor and determines that a second condition different from the first condition becomes satisfied while the electronic control unit executes the autonomous steering control;

terminate executing the autonomous steering control when the electronic control unit does not track the obstacle, based on the information acquired by the sensor and determines that the first condition becomes satisfied while the electronic control unit executes the autonomous steering control; and determine that the obstacle is not tracked when a lateral length of the obstacle is shorter than a predetermined value.

2. The collision avoidance assist apparatus as set forth in claim 1, wherein:

the electronic control unit is configured to acquire a control termination angle by which the electronic control unit needs to turn the own vehicle in order to orient the own vehicle in the laterally extending direction of the obstacle when the electronic control unit starts to execute the autonomous steering control;

the first condition is a condition that the obstacle is not in a predetermined area in front of the own vehicle; and the second condition is a condition that the own vehicle has turned by the control termination angle.

3. The collision avoidance assist apparatus as set forth in claim 2, wherein:

the predetermined area is a rectangular area having a lateral length equal to or longer than a width of the own vehicle and a longitudinal length equal to or longer than a distance between the own vehicle and a most distant point of the obstacle.

4. The collision avoidance assist apparatus as set forth in claim 2, wherein:

the control termination angle is an angle acquired by adding a predetermined margin angle to an angle defined by the laterally extending direction of the obstacle and the longitudinally extending center line of the own vehicle.

5. The collision avoidance assist apparatus as set forth in claim 1, wherein:

the electronic control unit is configured to:

acquire a position of a most distant point on the obstacle from the own vehicle with a predetermined cycle, based on the information acquired by the sensor;

estimate a current position of the most distant point acquired last time;

determine that the electronic control unit tracks the obstacle when the most distant point acquired this time is within a predetermine range from the estimated current position; and determine that the electronic control unit does not track the obstacle when the most distant point acquired this time is not within the predetermine range from the estimated current position.

6. The collision avoidance assist apparatus as set forth in claim 1, wherein:

the electronic control unit is configured to:

set a target avoidance route along which the electronic control unit moves the own vehicle to avoid the own vehicle from colliding with the obstacle when the electronic control unit starts to execute the autonomous steering control; and turn and move the own vehicle such that the own vehicle moves along the target avoidance route while the electronic control unit executes the autonomous steering control.

7. The collision avoidance assist apparatus as set forth in claim 1, wherein:

the electronic control unit is configured to:

acquire a predicted collision amount of time predicted for the own vehicle to take to reach the obstacle if the own vehicle moves with maintaining a current moving state of the own vehicle, based on the information acquired by the sensor when the electronic control unit detects the obstacle; and determine that the own vehicle potentially collides with the obstacle when the predicted collision amount of time becomes equal to or shorter than a predetermined threshold.

8. The collision avoidance assist apparatus as set forth in claim 1, wherein:

the electronic control unit is configured to execute an autonomous brake control to autonomously brake the own vehicle when the electronic control unit executes the autonomous steering control.

9. The collision avoidance assist apparatus as set forth in claim 1, wherein:

the sensor includes at least one of a camera sensor and a radar sensor.

* * * * *